United States Patent [19]

Guagliardo et al.

[11] Patent Number: 4,761,337

[45] Date of Patent: Aug. 2, 1988

[54] CATIONIC ELECTRODEPOSITABLE RESIN COMPOSITIONS CONTAINING POLYURETHANE RESIN DISPERSIONS

[75] Inventors: Matthew Guagliardo, Bloomfield, N.J.; Tapan K. DebRoy, Novi, Mich.; John Pucknat, New York, N.Y.

[73] Assignee: BASF Corporation, Clifton, N.J.

[21] Appl. No.: 34,140

[22] Filed: Apr. 2, 1987

Related U.S. Application Data

[62] Division of Ser. No. 912,753, Sep. 26, 1986, abandoned.

[51] Int. Cl.[4] ............... B32B 27/00; B32B 27/40; C08L 63/02
[52] U.S. Cl. .................. 428/425.8; 525/453; 525/458; 525/528; 525/457; 523/417; 523/420
[58] Field of Search ............... 428/416, 425.8; 525/453, 528, 458, 457; 523/417, 420

[56] References Cited

U.S. PATENT DOCUMENTS

| | | | |
|---|---|---|---|
| 3,984,299 | 10/1976 | Jerabek | 523/415 |
| 4,046,729 | 9/1977 | Scriven et al. | 524/589 |
| 4,066,591 | 1/1978 | Scriven et al. | 428/262 |
| 4,147,679 | 4/1979 | Scriven et al. | 428/262 |
| 4,182,831 | 1/1980 | Hicks | 528/103 |
| 4,225,478 | 9/1980 | Hicks | 528/103 |
| 4,575,523 | 3/1986 | Anderson et al. | 523/414 |
| 4,575,524 | 3/1986 | Anderson et al. | 523/414 |

Primary Examiner—John C. Bleutge
Assistant Examiner—Robert E. L. Sellers, II
Attorney, Agent, or Firm—Emil Richard Skula

[57] ABSTRACT

Cathodic electrodepositable resin compositions and aqueous electrodeposition coating baths comprising these resins are disclosed. The resin compositions comprise a cationic amine epoxy resin adducts and a cationic polyurethane resin adduct dispersion. The resin compositions when combined with a cross-linking agent and cathodically electrodeposited produce films which cure to durable, flexible, smooth corrosion-resistant, impact and chip-resistant films.

2 Claims, No Drawings

CATIONIC ELECTRODEPOSITABLE RESIN COMPOSITIONS CONTAINING POLYURETHANE RESIN DISPERSIONS

TECHNICAL FIELD

The field of art to which this invention pertains is electrodepositable resin compositions, and, more specifically epoxy resin compositions and urethane resin compositions for use in cathodic electrodeposition coating processes.

BACKGROUND ART

The electrodeposition of aqueous cationic resin compositions onto conductive substrates is well known in the art. It is standard operating practice among American automobile manufacturers to coat automobile frames and sheet metal with an anti-corrosive, electrodeposited cathodic resin composition which is cured to a hard, durable protective coating.

In a typical electrodeposition process an aqueous bath is prepared from a principal emulsion and a pigment paste. The principal emulsion typically comprises an aqueous epoxy-amine resin adduct which has been salted with an acid to solubilize the adduct and mixed with a cross-linking agent. Typical cross-linking agents include the blocked polyisocyanates. The pigment paste typically comprises a mixture of an epoxy-amine adduct which has been salted with an acid and a pigment which are ground together to form a pigment paste. The pigment paste is mixed with the principal emulsion and distilled water at the coating site to form an aqueous coating bath having the desired solids concentration. The aqueous coating bath is typically contained within an insulated tank having sufficient capacity to completely immerse any objects that will be coated therein. The tank contains an anode which is connected to a DC circuit. Additives conventional in the art may be added to the bath to improve coating characteristics.

An article which is to be coated typically comprises an electrically conductive material. The article is connected to a direct current circuit to act as a cathode. When the object is immersed in the coating bath contained in the coating tank, a flow of direct current electricity across the object causes the principal emulsion and pigment paste to be deposited on the surfaces of the coated article. The article is typically removed from the bath when the desired thickness of film has been deposited, then the article is optionally washed with distilled water. The article and deposited film are then typically moved to an oven where the film is cured to a smooth, hard, durable cross-linked coating.

Cathodic electrodepositable amine-epoxy resin adduct compositions, methods of manufacturing these cathodic electrodepositable resin compositions, aqueous cationic electrodeposition baths and processes for the deposition of these resins from a coating bath onto a conductive object are disclosed in U.S. Pat. Nos. 3,984,299, 3,468,779, 4,116,900, 4,093,594, 4,137,140, 4,104,147, 4,225,478, 4,419,467, and 4,432,850, 4,575,523, and 4,575,524.

Cathodic electrodepositable resin coatings provide a metal substrate with a superior corrosion-resistant primer coating. It is known that cationic resin compositions provide superior protection to a steel substrate than anodic resin compositions. In the automotive industry, these coatings are typically overcoated with a multi-layer coating such as a colored base coat and a clear top coat.

Although the electrodepositable cationic epoxy-amine resin adduct compositions are known to provide durable, smooth, corrosion resistant, hard films, it is also known that the hardness of epoxy-amine resin adduct films has several disadvantages. One disadvantage is that sudden impacts, wherein the underlying substrate is deformed, tend to cause the cured electrodeposited film along with any top coats to break away from the substrate. This is undesirable since many coated objects are subjected during the course of their typical usage to situations wherein sudden impacts with another object having sufficient momentum and/or mass result in dents in the coated object. The lifting of the coating from the dented portion of the coated object is undesirable since it is not always possible to immediately repair the damaged section of the coating and the underlying substrate is consequently subjected to corrosion for extended periods of time. In addition, automobile bodies are constantly exposed to high velocity flying debris such as stones, pebbles, etc. The collisions of the pebbles and debris with the coated substrate, depending on the mass, size and shape of the pebbles and the angle of impact, and the velocity typically causes paint to chip away at the point of impact between the pebble or stone and the coated automotive body, thereby exposing the underlying substrate.

Film forming compositions comprising polyurethane resin dispersions are known but these compositions produce cured films which are too soft for use as a primer and the films do not have the corrosion resistance required for a primer coating. In addition, these compositions are known to be available only for anodic electrodeposition.

Therefore what is needed in this art is a cationic electrodepositable resin composition which produces coatings having improved flexibility, improved impact-resistance and resistance to chipping along with smoothness, anti-corrosivity, and durability.

DISCLOSURE OF INVENTION

Novel cathodic electrodepositable resin compositions comprising an amine-epoxy resin adduct in admixture with a urethane resin adduct are disclosed. The composition when mixed with a cross-linking agent and salted is curable after deposition to a durable, flexible, impact-resistant and chip-resistant film.

Another aspect of this invention is a coated article coated with an electrodepositable cationic coating composition, wherein the coating composition comprises an amine-epoxy resin adduct, a urethane resin adduct, and a cross-linking agent. The coated article, comprising a conductive substrate, is produced by initially connecting the article to a DC electric circuit to act as a cathode, next the article is immersed in a cathodic electrodeposition aqueous coating bath containing the acid salted resin composition and anode. Then a sufficient amount of electrical power is passed across the article for a sufficient amount of time to produce a film of the composition on the article. The article is then removed from the coating bath and the film is cured. The cured film thereby produced is durable, smooth, flexible, impact-resistant and chip-resistant.

Another aspect of this invention is an aqueous cathodic electrodeposition coating bath comprising an acid-solubilized amine-epoxy resin, an acid solubilized urethane resin and a cross-linking agent. The amine-epoxy resin adduct, the urethane resin adduct and the cross-linking agent when deposited on a conductive substrate in a cathodic electrodeposition process produce a film which cures to a durable, hard, flexible, impact-resistant and chip-resistant coating.

Yet another aspect of the present invention is a method of depositing by cathodic electrodeposition a salted cationic resin composition in admixture with a salted urethane resin composition and a cross-linking agent on a conductive article by forming an aqueous coating bath with the salted resin composition. Then, the article is connected to a DC electrical circuit so that the article serves as a cathode, the article is immersed in the coating bath and sufficient electrical power is passed through the article so that a coating of the resin compositions and the cross-linking agent is deposited on the article. The article is removed from the bath and the coating is cured. The resin composition comprises an amine-epoxy resin adduct and a urethane resin. The cured films produced by this method are characterized as smooth, hard, durable, flexible, impact-resistant, and chip-resistant.

The foregoing, and other features and advantages of the present invention will become more apparent from the following description.

BEST MODE FOR CARRYING OUT THE INVENTION

The polyurethane resin adducts used in the practice of the present invention are referred to as polyurethane dispersions since the polyurethane resin adducts are dispersible in water as a polymer particle suspension.

The polyurethane dispersions are formed by the reaction, in an organic solvent, of (A) diisocyanates, (B) a mixture of polyols, and (C) suitable precursors that can be converted to a cationic salt by adding a neutralizing or quaternizing agent.

The diisocyanate components (A) which are useful according to this invention include those conventionally used in preparing polyurethane resins and include, for instance, toluene diisocyanates, such as the 2,4 and 2,6 isomers and their mixtures, 1,5 naphthylene diisocyanate, p-phenylene diisocyanate, 3,3'-dimethyl, 4,4'-diphenyl methane diisocyanate, and 4,4'-diphenylmethane diisocyanate.

Preferred diisocyanates are of the aliphatic type since it has been found that these provide better color stability in the finished coating. Examples include isophorone diisocyanate, 1,6-hexamethylene diisocyanate, methylcyclohexylene diisocyanate, and bis(4-isocyanatocyclohexyl) methane. Mixtures of diisocyantes can also be employed.

The polyols (B) can be either low or high molecular weight materials and preferably include a mixture of the two and, in general, will have average hydroxyl values as determined by ASTM designation E-222-67, Method B, between about 1000 and 10, and preferably between about 500 and 50.

The polyols include low molecular weight polyols. The low molecular weight diols useful in the instant invention are known in the art. They have hydroxy values of 200 or above, usually within the range of 1500 to 200. Such materials include aliphatic polyols, particularly alkylene polyols containing from 2 to 18 carbon atoms. Examples include ethylene glycol, 1,4-butanediol, 1,5-pentanediol, neopentyl glycol, 1,6-hexanediol, and cycloaliphatic polyols such as 1,4-cyclohexanediol and 1,4-cyclohexane dimethanol.

For the enhancement of flexibility and elastomeric properties, the polyurethane dispersion should preferably contain at least a portion of higher molecular weight polymeric polyol. Such polymeric polyols should be predominantly linear (that is, absence of trifunctional or higher functionality ingredients) to avoid gelling of the resultant polymeric product, and should have a hydroxy value of 200 or less, preferably within the range of 150–30.

The most suitable polymeric polyols include polyalkylene ether polyols, polyester polyols including polyhydroxy polyester amides and hydroxyl-containing polycaprolactones.

Any suitable polyalkylene ether polyol may be used including those which have the following structural formula

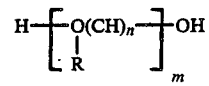

where the substituent R is hydrogen or lower alkyl including mixed substituents, and n is typically from 2 to 6, and m is from 2 to 100 or even higher. Included are poly(oxytetramethylene) glycols, poly(oxyethylene) glycols, and polypropylene glycols.

Polyester polyols can also be used as a polymeric polyol component in the practice of the invention. These can be prepared by the polyesterification of organic polycarboxylic acids or anhydrides thereof with organic polyols and are typical of those used in the art, e.g. U.S. Pat. No. 4,423,179, the disclosure of which is incorporated reference.

Besides polyester polyols formed from polybasic acids and polyols, polycaprolactone-type polyesters can also be employed. These materials are formed from the reaction of a cyclic lactone such as epsilon-caprolactone with a polyol or a hydroxy acid.

The higher molecular weight polymeric polyol component is preferably combined with low molecular weight polyol described above. It has been found that by blending high and low molecular weight polyols, optimum properties can be obtained in the resultant polyurethane dispersion. Preferably, the polymeric polyol is the major component, being present in an amount of about 25 to 95 percent by weight based on total weight of the polyol used to prepare the polyurethane dispersion, the remainder being low molecular weight polyol.

Suitable materials (c) for introducing cationic groups in the polyurethane dispersion to form amine resin adducts are compounds which contain at least one active hydrogen capable of reaction with isocyanate groups, and at least one group capable of cationic salt formation.

Examples of materials which can be used are compounds which have acid neutralized primary or secondary amino groups or basic tertiary amino groups.

Specific examples of compounds which have active hydrogens and basic tertiary amino groups are aliphatic, cycloaliphatic, aromatic, and heterocyclic amino alcohols, diols, and triols. Examples include N,N-dimethylethanol amine, N-hydroxyethylpiperidine. N-methyldiethanolamine, and cyclohexyl diethanolamine.

The solvent used to prepare the polyurethane prepolymer may consist, for example, of either Acetone, 2-butanone, 2-heptanone, etc., and is used in an amount to give sufficiently low viscosities to enable adequate mixing of reagents. For use in electro-depositable resin compositions, the organic solvent is removed, after product neutralization or quarternization and dilution with water, by azeotropic distillation. The final product consists of a stable cationic polyurethane dispersion of colloidally-sized particles in water.

The polyurethane resin adduct compositions of the present invention are made by processes conventional in the art such as initially charging to a suitable reactor vessel, having a mixing means, and a temperature control means sufficient quantities of organic solvent, diisocyanates, polyols, and suitable cationic salt precursors and holding the reactants for a sufficient amount of time at a sufficient temperature to form a polyurethane resin adduct dispersion. Typically about 5.0 parts to about 30.0 parts of organic solvent is charged, more typically about 10.0 parts to about 15.0 parts and preferably about 12.0 parts. Typically about 10.0 parts to about 40.0 parts of polyol is charged, more typically about 15.0 parts to about 30.0 parts and preferably about 20.0 parts. Typically about 0.5 parts to about 20.0 parts of cationic precursor is added, more typically about 1.0 parts to about 10.0 parts, preferably about 3.0 parts. Typically about 5 parts to about 30 parts of polyisocyanate is charged, more typically about 10 parts to about 15 parts, and preferably about 12 parts. The reactants are heated typically at about 35° C. to about 110° C., more typically 50° C. to about 100° C., preferably 85° C. for typically about 1 hour to about 10 hours, more typically about 3 hours to about 6 hours, preferably about 4 hours. The heating is done in a dry inert atmosphere.

The polyurethane resin adduct is solubilized by adding to the resulting reaction products typically about 0.5 parts to about 10.0 parts of neutralizing agent such as an acid, more typically about 1.0 parts to about 5.0 parts and preferably about 1.5 parts.

The aqueous polyurethane resin adduct dispersions of the present invention will typically comprise about 20.0 wt. % to about 50.0 wt. % polyurethane resin adduct, more typically about 30.0 wt. % to about 40.0 wt. % and preferably about 35.0 wt. %.

The pH of the dispersion is typically about 4.0 to about 7.0, more typically about 5.0 to about 6.0, and preferably about 5.5. The viscosity of the polyurethane resin adduct dispersions of the present invention will typically be about 0.5 poise to about 30.0 poise, more typically about 1.0 poise to about 20 poise and preferably about 2.0 poise.

The organic polyisocyanates used in the practice of this invention for incorporation into a cationic electrodepositable resin are typical of those used in art, e.g., U.S. Pat. No. 4,182,831, the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, any suitable organic polyisocyanate can be used. Representative examples are the aliphatic compounds such as trimethylene, tetramethylene, pentamethylene, hexamethylene, 1,2-propylene, 1,2-butylene, and 1,3-butylene diisocyanates; 3-isocyanatomethyl-3,5,5-trimethylcyclohexylisocyanate; the aromatic compounds such as m-phenylene, p-phenylene, 4,4'-diphenyl, and 1,4-xylylene diisocyanates; the triisocyanates such as triphenyl methane-4,4,4'-triisocyanate, 1,3,5-benzene triisocyanate and 2,4,6-toluene triisocyanate; and the tetraisocyanates such as 4,4,'-diphenyl-dimethyl methane-2,2', 5,5'-tetraisocyanate; the polymerized polyisocyanates such as toluene diisocyanate dimers and trimers, polymethylenepolyphenylene polyisocyanates having NCO functionalities of 2 to 3, and the like.

In addition, the organic polyisocyanate can be a prepolymer derived from a polyol such as glycols, e.g. ethylene glycol and propylene glycol, as well as other polyols such as glycerol, trimethylolpropane, hexanetriol, pentaerythritol, and the like, as well a monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Particularly preferred polyisocyanates include the reaction product of toluene diisocyanate and trimethylol propane and, the isocyanurate of hexamethylene diisocyanate.

The blocking agents which can be used to block the polyetherpolyol polyisocyanate adducts are those known in the art.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, ethylene glycol monoethyl ether, monobutyl ether, monopropyl ether and the like; the phenolic compounds such as phenol itself, substituted phenols in which the substituents do not adversely affect the coating operations. Examples include cresol, nitrophenol, chlorophenol and t-butyl phenol.

A preferred blocking agent is monopropyl ether of ethylene glycol. Additional blocking agents include tertiary hydroxyl amines, such as diethylethanolamine and oximes, such as methylethyl ketoxime, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate at a sufficient temperature for a sufficient amount of time under reaction conditions conventional in this art such that no free isocyanate groups are present when the reaction has run its course. Typically about one mole of polyisocyanate is charged into a conventional reactor vessel. Typically about one mole to about five moles of blocking agent is added, more typically about two moles to about five moles, preferably about two moles to about four moles. In addition one or more of the following compositions is charged: methyl isobutyl ketone, methyl ethyl ketone, toluol, or an equivalent aprotic organic solvent.

The reaction temperature varies with the type of polyisocyanate used, for example, when reacting toluene disocyanate-trimethanol propane with a ketoxime, the reaction is typically carried out at about 150° F. to about 220° F., more typically about 160° F. to about 210° F., and preferably about 180° F. to about 200° F. The reactor charge is mixed for about 15 minutes to about 120 minutes, more typically about 20 minutes to about 40 minutes, and preferably about 25 minutes to about 35 minutes.

The cathodic electrodepositable coating compositions of this invention comprise epoxy resins which may optionally be chain-extended resulting in an increase in the molecular weight of the epoxy molecules by reacting with water miscible or water soluble polyols.

The epoxides useful in the practice of this invention are the polyepoxides typically used in this art and comprise a resinous material containing at least one epoxy group per molecule.

A particularly useful class of polyepoxides are the glycidyl polyethers of polyhydric phenols.

Such polyepoxide resins are dervived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis (2-hydroxynaphthy) methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000 more typically about 800 to about 1,600 and preferably about 800 to about 1,500.

The polyepoxides used in the practice of this invention will have a relatively high molecular weight, that is, the more typically about 1,600 to about 3,200, and preferably about 1,600 to about 2,800.

Another quite useful class of polyepoxides are produced similarly from novolak resins or similar polyphenol resins.

Also suitable are the polyepoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis (4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid terephthalic acid, 2,6-naphthalene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides These polyepoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogenous diepoxides such as disclosed in U.S. Pat. No. 3,365,471; epoxy resins from 1,1-methylene bis (5-substituted hydantoin), U.S. Pat. No. 3,391,097; bisimide containing diepoxides, U.S. Pat. No. 3,450,711; epoxylated ammomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Although any conventional amine-epoxy resins adducts known in the cathodic electrodeposition art can be used in the practice of the present invention, it is preferable to use modified epoxy resins. Specifically, the modified epoxy resins used in the practice of this invention will comprise one of the aforementioned epoxy resin compositions chain extended with water miscible or water soluble polyol, reacted with excess amine, and finally reacted with a fatty acid or aliphatic monoepoxide. These epoxy amine resin adduct compositions are disclosed in U.S. Pat. Nos. 4,575,523 and 4,575,524, the disclosures of which are incorporated by reference. However, epoxy-amine resin adducts produced by methods known in the art such as by the diketimine method, may be used in the practice of the present invention.

The water soluble or water miscible polyols, used to optionally chain extend epoxy resins, include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000, more typically about 300 to about 1,000, and preferably about 400 to about 700.

Water miscible is defined as the ability or tendency of the polyol to mix or blend uniformly with water. By water soluble is meant the ability or tendency of the polyol to blend uniformly with water.

The organic polyols which are used in the practice of this invention are those known in the art, e.g. polyols disclosed in U.S. Pat. No. 4,104,147 which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specified examples of the organic polyols used in the practice of this invention include Tone 200 brand polyol manufactured by Union Carbide Corp., Carbowax PG 300 and Carbowax PG 300 and Carbowax PG 400 polyols manufactured by Union Carbide Corp., SynFac 8007 and SynFac 8008 brand polyols manufactured by Milliken Chemical Co., Spartanburg, S.C., and Hycar HTBN brand polyol manufactured by B. F. Goodrich Chemical Corp., Cleveland, Ohio. A particularly preferred polyol is SynFac 8008 brand.

The optional modification of the polyepoxide, that is, the chain extension and corresponding increase of molecular weight, is accomplished by mixing the organic polyol with the polyepoxide in an organic solvent, such as toluene, methyl isolbutyl ketone, xylene, etc., and reacting these products at sufficient temperature for a sufficient amount of time in a conventional reactor in the presence of a catalyst to completely react the polyepoxide. Typically, the reaction temperature will be about 200° F. to about 350° F., more typically about 250° F. to about 350° F., preferably about 260° F. to about 300° F.

Typically the reaction time is about 120 minutes to about 300 minutes, more typically about 160 minutes to about 260 minutes, preferably about 180 minutes to about 240 minutes.

Typically about 1.5 to about 3 epoxide equivalents of polyepoxide are reacted, more typically about 2 to about 2.5, preferably about 2 equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

The polyamines used in the practice of this invention are typical of those known in the art such as the polyamines disclosed in U.S. Pat. No. 4,139,510, which is incorporated by reference.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, 3 to about 8 amine hydrogen atoms and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, o,m and p-phenylene diamine 4,4'-methylene dianiline, menthane diamine, 1,4-diaminocyclohexane, methyl-aminopropylamine, and the like. Preferred amines for use in this invention are alkylene polyamines of the formula:

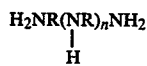

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine, tetraethylene pentamine, and diethylene triamine.

Sufficient quantities of polyamine are reacted with sufficient quantities of modified polyepoxide resin so that the adduct formed contains about 1 mole of adducted polyamine molecule for each epoxide equivalent originally present in polyepoxide resin. The adducting reaction typically requires about 1.5 to about 15.0 moles of polyamine, i.e., an excess, for each epoxide equivalent of the polyepoxide resin, more typically about 2.0 moles to about 12.0 moles, and preferably about 3.0 moles to about 10.0 moles. Since excess polyamine is used, the excess unreacted polyamine must be removed by distillation after reaction to prevent gellation of the reaction product.

In preparing the modified epoxy-polyamine compositions sufficient quantities of polyamine are reacted with sufficient quantities of modified polyepoxide resin in a conventional reactor vessel for a sufficient period of time at a sufficient temperature to react all of the epoxide groups. Typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes, and preferably about 25 minutes to about 30 minutes. When the adducting reaction is complete, the unreacted or excess polyamine is removed by distillation with sufficient vacuum and at a sufficient temperature to remove the excess polyamine. Typical distillation temperatures are about 275° F. to about 500° F., more typically 320° F. to about 475° F. and perferably about 425° F. to about 450° F. Typical vacuums are about 60 mmHg to about 76 mmHg, typically about 65 mmHg to about 76 mmHg and preferably about 74 mmHg to about 76 mmHg.

Fatty acids which can be used, to optionally modify the epoxy resins used in the practice of this invention, are monocarboxylic acids containing about 4 to 22 carbon atoms. The fatty acids may be saturated or unsaturated. The fatty acids are typically of those known in the art. Examples of such acids are caprylic acid, capric acid, stearic acid, benzoic acid, oleic acid, linoleic acid, linolenic acid and lauric acid. Such acids can be those derived from naturally occurring oils and which are named from the oil from which it is derived, e.g., linseed fatty acids, soya fatty acids, cottonseed fatty acids, cocoanut fatty acid and the like. A particularly preferred fatty acid is pelargonic acid.

The monoepoxides which can be used to optionally modify the epoxy resins used in the practice of this invention contain one 1,2-epoxide group per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglycidyl esters of aliphatic alcohols and monoglycidyl esters of monocarboxylic acids. Examples of such monoepoxides are: epoxidized unsaturated hydrocarbons which contain 6 to about 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides or fatty acids are optionally reacted with the modified epoxy-polyamine adducts of this invention to improve the electrical insulating properties of the deposited electrodepositable resin compositions of this invention. In addition, these components improve the properties of the deposited coating such as flexibility, corrosion resistance, and hardness.

Sufficient quantities of modified epoxy-polyamine adducts are mixed with sufficient quantities of fatty acid or monoepoxide in an organic solvent such as xylene, or toluene in a conventional reactor vessel for a sufficient period of time at a sufficient temperature to complete the reaction. Typically about one mole of modified epoxy-polyamine adduct is reacted with the following amounts of fatty acid or monoepoxide.

When fatty acid is the reactant, typically about 0.5 moles to about 2.75 moles of fatty acid are reacted with the adduct, more typically about 1 mole to about 2.25 moles, and preferably about 1 mole to about 2 moles. The reaction temperature is typically about 300° F. to about 400° F., more typically about 325° F. to about 390° F., and preferably about 350° F. to about 375° F.; the reaction time is about 60 minutes to about 180 minutes, more typically about 60 minutes to about 140 minutes and preferably about 120 minutes, or until the acid value is reduced to below about 6.

When monoepoxide is the reactant, typically about 0.5 mole to about about 2.25 moles of monoepoxide are reacted with the adduct, more typically about 1 mole to about 2.25 moles, preferable about 1 mole to about 2 moles. The reaction temperature is typically about 150° F. to about 300° F., more typically about 150° F. to about 280° F., and preferable about 150° F. to about 250° F.; reaction times are typically about 60 minutes to about 180 minutes, more typically about 60 minutes to about 150 minutes, and preferably about 60 minutes to about 100 minutes.

Sufficient quantities of blocked polyisocyanate are incorporated into the electrodepositable coating compositions of this invention such that the deposited coating will be completely cured upon baking and there will be no free isocyanate groups remaining.

Typically, about 20 wt. % to about 80 wt. % of blocked polyisocyanate is incorporated based upon the total weight of amine containing-epoxide resin composition and cross-linking agent, more typically about 30 wt. % to about 70 wt. %, preferably about 35 wt. % to about 45 wt. %.

The blocked polyisocyanates of this invention are mixed with the epoxy resin compositions, preferably the optionally modified epoxy-polyamine-fatty acid or epoxy-polyamine-monoepoxide reaction products, by adding the blocked polyisocyanates to a reactor containing the epoxy-amine resin adduct composition and mixing the charge for about one-half hour.

In order to solubilize an amine-epoxy resin adduct composition, it is necessary to salt the reaction product with a water soluble acid. The acids which can be used include those known in the art such as formic acid, acetic acid, phosphoric acid, lactic acid, hydrochloric acid, etc. Sufficient quantities of the acid are mixed with said amine-epoxy resin adduct compositions to solubilize or disperse the resin in water. One method in which the salting process is accomplished is by charging the amine-containing epoxy resin composition, an acid, cosolvents, water and surfactants conventional in the art into a reactor vessel, and mixing the reactor charge with a slow speed mixer until the reaction has been completed. In a preferred method, acid, water, etc. are initially added to a reactor vessel, then the resin is charged while the reactants are mixed with a slow speed mixer. Typically, the reaction temperature is about 25° F. to about 15° F., more typically about 100° F. to about 140° F., and preferably about 120° F. The reaction will be typically run for about 15 minutes to about 90 minutes, more typically about 25 minutes to about 80 minutes, and preferably 60 minutes.

Typically, about 0.1 Meq to about 0.8 Meq of acid is used per gram of solid resin, more typically about 0.2 Meq to about 0.7 Meq, and preferably about 0.2 Meq to about 0.5 Meq.

Although the amine-epoxy resin adduct and the urethane resin adduct dispersion can be blended separately into the coating bath at a coating site, it is preferable to blend the epoxy-amine resin adduct with the urethane resin adduct dispersion to form a blend which is used as a principal emulsion. The principal emulsion is then directly incorporated into the coating bath. Typically a principal emulsion of the present invention comprises about 40.0 wt. % to about 65.0 wt. % of amine-epoxy resin adduct, more typically about 55.0 wt. % to about 62.0 wt. % and preferably about 59.0 wt. %. Sufficient quantities of the polyurethane resin adduct disperion is incorporated into the principal emulsions and coating baths of the present invention to produce cured films having improved chip resistance, flexibility and impact resistance. The principal emulsion will typically comprise about 5.0 wt. % to about 35.0 wt. % of the polyurethane resin dispersion, more typically about 7.0 wt. % to about 30.0 wt. %, and preferably about 10.0 wt. % to about 28.0 wt. %.

The concentration of the polyurethane resin adduct dispersion in an aqueous coating bath will typically be about 3.0 wt. % to about 30.0 wt. %, more typically about 5.0 wt. % to about 23.0 wt. %, and preferably about 7.0 wt. % to about 15.0 wt. %.

The concentration of amine-epoxy resin adduct in an aqueous coating bath is typically about 30.0 wt. % to about 50.0 wt. %, more typically about 35.0 wt. % to about 45.0 wt. % and preferably about 40.0 wt. %.

Electrodepositable cathodic coating compositions of this invention are used in an electrodeposition process as an aqueous dispersion. Sufficient quantities of the resin composition are used depending upon the particular application parameters so that the concentration of the resin composition in an aqueous bath will produce a coating on an article of sufficient thickness so that upon baking, the coating will have desired characteristics such as a smooth surface. Typically, the coating bath concentration of the resin compositions of this invention are about 15.0 wt. % to about 28.0 wt. %, and preferably about 20.0 wt. % to about 22.0 wt. %.

It should be noted that the cathodic electrodepositable resins are typically shipped by the manufacturer to the user as a salted aqueous dispersion having a concentration of about 20 wt. % to about 36 wt. % of solids.

The cathodic electrodepositable coating baths of this invention are typically formed by mixing the solubilized (i.e., salted) cathodic electrodepositable resin compositions of this invention in concentrate form with water, although dry resin could be used. The electrodeposition bath may contain additional ingredients such as pigments, cosolvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulfate, barium yellow, cadmium red, chromic green, lead silicate, etc. Sufficient quantities of pigment are used to achieve the appearance characteristics desired such as gloss, reflectance, hue, tint and other desired characteristics. Typically, the amount of pigment used is expressed in a ratio of total pigment of total binder. Typically a pigment to binder ratio of about 0.1 to about 0.4 is used in the electrodepositable resin compositions of the present invention, more typically about 0.15 to about 0.35, preferably about 0.2 to about 0.3. Pigment is typically added to the electrodeposition bath in paste form, i.e., predispersed in a composition comprising pigment, amine-epoxy resin adduct, and surfactants.

The electrodeposition baths may contain coupling solvents which are water soluble or partially water soluble organic solvents for the resinous vehicles used in the practice of this invention. The coupling solvents or cosolvents used in the practice of this invention are those typically used and known in the art.

Examples of such coupling solvents include ethylene glycol monomethyl ether, ethylene glycol monoethyl ether, ethylene glycol monobutyl ether, diethylene glycol monobutyl ether, ethanol, isopropanol, n-butanol, etc. Sufficient amounts of coupling solvent are used so that a good emulsion resulting in a smooth deposited film is produced. Typically, the amount of coupling solvent used will be about 0.5 wt. % to about 10 wt. % of the total weight of the coating bath, more typically about 1 wt. % to about 5 wt. %, and preferably about 1 wt. % to about 2 wt. %.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used to coat articles such as automobile or truck bodies. The typical size of an electrodepositon bath tank used for this purpose is about 60,000 gallons to about 120,000 gallons.

Typically, the article to be coated is connected to the direct current circuit so that the conductive object acts as the cathode. When the article is immersed in the coating bath, a flow of electrons from the cathode to the anode (that is, conventional current flow from the anode to the cathode) results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and perferably about one ampere per sq. ft. The article to be coated typically remains in the coating bath for a sufficient period of time to produce a coating or film of sufficient thickness, having sufficient flexibility and having sufficient resistance to corrosion. The residence time or holding time is typically about 1 minute to about 3 minutes, more typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

When the desired thickness of the coating has been achieved the coated object is removed from the electrodeposition bath and cured. Typically, the electrodeposited coatings are cured in a conventional convection oven at a sufficient temperature for a sufficient length of time to unblock the blocked polyisocyanates and allow for cross-linking of the electrodepositable resin compositions. Typically, the coated articles will be baked at a temperature of about 200° F. to about 600° F., more typically about 250° F. to about 290° F., and preferably about 225° F. to about 275° F. The coated articles will be baked for a time period of about 10 minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids, and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset cross-linking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The coatings of the coated articles of this invention exhibit superior smoothness, gloss, flexibility, durability and resistance to corrosion. Smoothness and gloss are related to the flow of the electrodeposited cathodic resin. Durability, flexibility and resistance to corrosion are related to the chemical nature of the electrodeposited cathodic resin composition as well as the smoothness of the deposited coating. These coating compositions readily accept an automotive primer overcoat.

It should be noted that the articles which are coated by the coating compositions of this invention are typically automobile bodies which have been pretreated to remove impurities and contaminants in a phosphatizing bath, however, the coating compositions may be used to coat virtually any object comprising a conductive substrate.

The following example is illustrative of the principles and practice of this invention, although not limited thereto. Parts and percentages where used are parts and percentages by weight.

EXAMPLE

A. The following components were charged into a suitable reactor vessel:
  879 parts of Epon 828 having an epoxy equivalent weight of 188;
  263 parts of Bisphenol A; and
  323 parts of ethoxylated Bisphenol A having a hydroxy equivalent weight of 230 (Synfac 8009 from Milliken Chemical Co.).

The charge was heated to 100° C. under a dry nitrogen blanket and one part benzyl dimethyl amine was added to the reactor vessel. The reaction mixture was further heated to 130° C. until the desired WPE (weight per epoxy) was achieved, then 598 parts of toluene were added to the reactor to dilute the resulting adduct A.

B. A conventional reactor equipped with an agitator, thermometer, nitrogen line and a condensor was charged with 1260 parts of diethylene triamine. The diethylene triamine was slowly heated to 140° F. Then, 2063 parts of the adduct A were slowly added to the reactor during a one-hour time period. After the adduct A was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 550° F. over a 2.5 hour time period. The mixture was held at this temperature until no more distillate was coming out. The temperature was then lowered to 360° F. and 193 parts of Pelargonic acid along with 50 parts of xylene were added to the reactor. The resulting mixture was heated to 360° F. and held at reflux until the acid value was down to 6. Then the reaction mixture was cooled down to ambient temperature and reduced to 65% NV with methyl isobutyl ketone.

C. The cross-linker was prepared by slowly charging 870 parts of trimethylopropane into a reactor vessel containing 3387 parts of an 80/20 isomer mixture of 2.4/2.6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F., at which time 2026 parts of ethylene glycol monopropyl ether were added. The charge was maintained at 210° F. to 220° F. for one and one-half hours until essentially all of the isocyanate moiety was consumed as indicated by infrared scan. The batch was then thinned with 2116 parts of methyl isobutyl ketone. D. The adduct D and the adduct E are the two intermediates for the grinding vehicle. The adduct D was prepared by charging ethylene glycol monopropyl ether to 2.4-toluene diisocyanate under agitation with a dry nitrogen blanket. The reaction was maintained at a temperature below 100° F. The charge was held an additional one and one-half hours. E. To 455 parts of Triton X-102 (an alkylaryl polyether alcohol manufactured by Rohm and Hass Co., Philadelphia, Pa.) and 51 parts of methyl isobutyl ketone previously azeotroped to remove water, 109 parts of 2,4-toluene diisocyanate were added. The reaction was maintained at 115° F. for two hours.

To this product, 56 parts of dimethyl ethanol amine was charged, and the reaction was maintained at 160° F. for one hour. Finally, 50 parts of ethylene glycol monobutyl ether, 75 parts of lactic acid, and 89 parts of deionized water were added. The reaction was held at 190° F. for one hour.

F. The grinding vehicle was prepared by charging 88 parts of the adduct D to a reaction vessel containing 206 parts of EPON 1002F (WPE=650, manufactured by Shell Chemical Co., Houston, Tex.) and 39 parts of isobutyl methyl ketone. The reaction temperature was maintained at 250° F. for one hour. Then, 186 parts of ethylene glycol monobutyl ether and 381 parts of adduct E were added. The batch was maintained at 180° F. for four hours.

G. A pigment paste was prepared by grinding 203 parts of the grinding vehicle F, 17 parts of ethyl glycol monobutyl ether, 274 parts of deionized water, 67 parts of aluminum silicate, 317 parts of $TiO_2$, 30 parts of lead silicate, 6 parts of dibutyl tin oxide in a steel ball mill to 12 microns. Then, 66 parts of additional deionized water was added.

H. The acrylic flow agent was prepared by charging 44 parts of butyl acrylate, 15 parts of hydroxyethyl acrylate, 15 parts of dimethylaminoethyl methacrylate, 2 parts of styrene, 1 part of octyl mercaptan, 4 parts of VAZO 67, and 3 parts of acetone to a refluxing mixture of 13 parts of methyl isobutyl ketone and 2 parts of acetone over a four-hour period. After fifteen minutes holding period, 0.14 parts of VAZO 67 and 1 part of methyl isobutyl ketone were added. The batch was maintained at the refluxing temperature for another hour.

I. The aqueous polyurethane dispersion was prepared by charging a reactor vessel with 177.7 parts of a polyester-diol (prepared from dimer acids, neopentyl glycol, and 1,4-cyclohexane dimethanol in respective molar ratio of 2.0/1.95/1.05), 0.9 parts of neopentyl glycol, 34.2 parts of N-methyl diethanol amine, and 53.6 parts of 2-butanone. A solution of isophorone diisocyanate, 108.4 parts, in 53.6 parts of 2-butanone was added and the mixture was heated, under a nitrogen atmosphere, to reflux temperatures (190° F.). The reaction mixture was held at 190° F. for a two hour period at which point an assay of 0.455 milliequivalents of NCO per gram of reaction mixture was obtained. The mixture was allowed to cool to 155° F. and 28.7 parts of trimethylol propane were added. The mixture was reheated to 190° F. After two hours, 0.4 parts of dibutyltin dilaurate were added and the reaction was continued until an assay for free NCO was negative. A solution of 17.2 parts of glacial acetic acid in 200 parts of water was added followed by 450 parts of additional water. Volatiles were then removed by azeotropic distillation to a batch temperature of 212° F. The entrained water was replaced by fresh water to give a stable aqueous dispersion of 33.6% nonvolatiles, having a pH of 6.0 and a Brookfield viscosity of 1.80 poises at 77° F.

J. A principal emulsion was prepared by adding 324 parts of B, 163 parts of C, 10 parts of H, and 8 parts of propylene glycol monophenyl ether to 140 part of deionized water and 3.7 parts of acetic acid under high agitation for one hour. An additional 255 parts of deionized water was added. After agitation for three days, organic solvents were driven off.

K. Three cathodic electrodeposition baths were made by blending the components as listed in the table.

TABLE

| Component | System I | System II | System III |
|---|---|---|---|
| Deionized Water | 390.15 | 390.15 | 390.15 |
| Acetic Acid | 0.25 | 0.25 | 0.25 |
| Principal Emulsion J | 309.31 | 274.31 | 239.76 |
| Polyurethane Dispersion I | 34.77 | 69.77 | 104.32 |
| Pigment Paste G | 65.52 | 65.52 | 65.52 |

The baths had a pigment to binder ratio (P/B) equal to about 20/100. The percent nonvolatiles in each bath was about 20%. The pH of each bath was maintained at about 6.53 and the conductivity of the baths was maintained at 2.000 micro mhos.

Zinc phosphated bonderized steel panels were coated in each bath at a coating voltage of 300 volts for 2 minutes. The film thickness deposited on the panels ranged from about 1.2 to about 1.4 mils. The coated panels were baked at 300° F. for about 25 minutes to produce smooth, cured films.

The test panels were tested for reverse impact, conical mandrel paint loss on bend and crosshatch adhesion.

The reverse impact testing was conducted using a conventional Gardner Impact Tester instrument. The instrument comprised a steel tube and a vertically movable steel rod impact weight having a ⅝" hardened steel round-nosed punch. The weight is guided by the steel tube. A removable punch die and a punch holder were located underneath the weight. The impact range of the tester is 0 to 160 inch-pounds using a 4 pound weight dropped from a pre-selected height. The coated side of each test panel was mounted face down over a ⅝" hole in the base plate. The weight was raised by lifting a pin which extended from the rod through the slot in the tube. The weight was then dropped from the particular heights required to give impacts of 80 inch-pounds and 160 inch-pounds. The test panels were examined after impact for flaking and cracking of paint.

The conical mandrel paint loss on bend testing was conducted using a Conical Mandrel test instrument. The following test procedure was used. The operating lever of the instrument was placed in a horizontal position. Each coated test panel was placed between a mandrel and drawbox in the instrument and clamped in a vertical position adjacent to the mandrel by placing the long edge of the panel behind a clamping bar in such a manner that the panel was always set up to the narrow edge of the mandrel. Then the lever was rotatably moved through an arc of about 180 at a uniform angular velocity to bend the panel about 135 in about 15 seconds. The bent surface of the panel was examined for cracking and lifting of the coating.

The crosshatch adhesion test was conducted using a Gard Co. ® Paint Adhesion test instrument manufactured by Gardner Company. The following test procedure was used. The test instrument had knife edges which were pulled downward over the coated surface of each test panel, scratching the coating from top to bottom. A second crosswise cut at a 90° angle produced a grid of about 100 square sections in the coating. The panel surface was brushed to remove any detached flakes on ribbons of coating. A three inch long length of tape was placed over the center of the grid (with one free end) and smoothed using finger pressure to insure good tape to coating contact. The free end was then gripped and rapidly removed by pulling at a 180° angle. The grid was then inspected for coating removal.

The results of the testing are presented in the table.

TABLE

| | Reverse Impact | | Conical Mandrel Paint Loss On Bend | *Crosshatch |
|---|---|---|---|---|
| | 80 in-lbs | 160 in-lbs | (inches) | Adhesion |
| System I | 60% loss | 75% loss | 1⅛ | Excellent |
| System II | 5% loss | 40% loss | ⅞ | Excellent |
| System III | 52% loss | 64% loss | ½ | Excellent |
| Std | 100% loss | 100% loss | total loss | Failed |

*Crosshatch adhesion all noted before and after 96 hr. humidity wherein panels were placed in a conventional humidity chamber such as a Harshaw Humidity Cabinet manufactured by Harshaw Chemical Company, Cleveland, Ohio 44100 at 100° F. and 100% humidity.

The coatings had good salt spray resistance as measured by ASTM Test Method No. D3170, the disclosure of which is incorporated by reference. The test was conducted by scribing the center of each coated panel and spraying the panels with a 5.0 wt. % aqueous salt solution at 40 psig pressure and 100° F. The spraying was conducted in an enclosed box for 672 hours. Creepage of the coating around the scribed line was observed as a measure of salt spray resistance.

The coatings had a good gravel rating as measured by ASTM Test Method No. D3170 and S.A.E. Test Method No. J400. The test panels were mounted in a conventional gravelometer such as a Q.G.R. Gravelometer manufactured by Q-Panel Corporation, Cleveland, Ohio 44135. The gravel used was ⅜" to ⅝" graded gravel. The test was run at 70 psig. The coated panels were observed to have little or no chipping corresponding to good gravel ratings of 6 or better.

The test results demonstrated markedly improved coating retention versus a standard in the reverse impact testing indicating improved flexibility.

The conical mandrel paint loss on bend test indicated that the coatings had improved flexibility.

The crosshatch adhesion tests indicated that the coating baths containing polyurethane dispersions produced coatings having superior crosshatch adhesion.

The cathodic electrodepositable resin compositions of the present invention comprising an amine, epoxy-resin adduct in admixture with a polyurethane resin adduct dispersion surprisingly and unexpectedly result in cured, electrodeposited coating compositions having excellent corrosion resistance while having excellent resistance to chipping and separation from a conductive substrate. The cathodic electrodepositable resin compositions of the present invention provide enhanced protection to a substrate by reducing the likelihood of chipping or film separation.

Although this invention has been shown and described with respect to the detailed embodiments thereof, it will be understood by those skilled in the art that various changes in form and detail thereof may be made without departing from the spirit and scope of the claimed invention.

We claim:

1. A coated article formed by coating on an electrically conductive material coated with an electrodepositable cationic primer coating composition comprising an amine-epoxy resin adduct, a polyurethane dispersion of colloidally-sized particles in water, and a cross-linking agent, the coated article produced by initially connecting the article to a DC electric circuit to act as a cathode, immersing the article in a coating bath containing the acid salted resin composition and an anode, passing a sufficient amount of electrical power across the article for a sufficient amount of time to produce a film of the composition on the article, and then removing the article from the bath and curing the film, wherein the cured film thereby produced is durable smooth, flexible, impact-resistant and chip-resistant.

2. The coated article of claim 1 wherein the coating composition comprises
   about 65.0 wt. % to about 95.0 wt. % of an amine-epoxy resin adduct,
   about 5.0 wt. % to and about 35.0 wt. % of a polyurethane dispersion, and an effective amount of a cross-linking agent.

* * * * *